United States Patent [19]

Hattori et al.

[11] Patent Number: 5,311,215
[45] Date of Patent: May 10, 1994

[54] APPARATUS AND METHOD FOR FORMING DIGITAL IMAGE

[75] Inventors: Yoshihiro Hattori; Suguru Hamamichi, both of Toyokawa; Hideaki Kodama, Okazaki, all of Japan

[73] Assignee: Minolta Camera Kabushiki Kaisha, Osaka, Japan

[21] Appl. No.: 13,437

[22] Filed: Feb. 4, 1993

[30] Foreign Application Priority Data

Feb. 5, 1992 [JP] Japan .................................. 4-019900

[51] Int. Cl.$^5$ .............................................. G01D 15/00
[52] U.S. Cl. ............................ 346/160; 355/214; 358/501; 358/518; 358/521
[58] Field of Search ............... 355/200, 208, 214, 246; 346/157, 160; 358/501, 504, 505, 518, 519, 521

[56] References Cited

U.S. PATENT DOCUMENTS

| | | | |
|---|---|---|---|
| 4,198,154 | 4/1980 | Masegi et al. | 346/160 |
| 4,226,525 | 10/1980 | Sakamoto et al. | 355/214 |
| 4,277,162 | 7/1981 | Kasahara et al. | 355/246 X |
| 4,679,057 | 7/1987 | Hamada | 346/76 L |
| 4,816,924 | 3/1989 | Sekiya | 358/296 |
| 4,873,428 | 10/1989 | Takeuchi et al. | 250/214 DC |
| 4,894,685 | 1/1990 | Shoji | 355/246 |
| 4,914,459 | 4/1990 | Mama et al. | 346/160 |
| 5,061,949 | 10/1991 | Ogino et al. | 346/160 |
| 5,124,802 | 6/1992 | Ito et al. | 346/160 X |
| 5,148,289 | 9/1992 | Nishiyama et al. | 346/160 X |
| 5,162,821 | 11/1992 | Fukuchi et al. | 346/157 |
| 5,206,686 | 4/1993 | Fukui et al. | 355/208 |

FOREIGN PATENT DOCUMENTS 60-68358 4/1985 Japan .
61-25164 2/1986 Japan .

*Primary Examiner*—Fred L. Braun
*Attorney, Agent, or Firm*—Burns, Doane, Swecker & Mathis

[57] ABSTRACT

In forming a digital image on the photoconductor wherein the intensity of the laser beam is modulated according to multi-level image data, a standard toner image is formed at an intermediate intensity at which the reproduced image density is not affected by the beam size, and the toner density is detected. On the other hand, the size of the beam for exposing the photoconductor is measured. Then, the gradation characteristic is controlled according to the toner density and the beam size. Thus, the effect of the beam size on the gradation characteristic is corrected.

19 Claims, 20 Drawing Sheets

APPARATUS AND METHOD FOR FORMING DIGITAL IMAGE

BACKGROUND OF THE INVENTION

1. Field of the Invention

The present invention relates to an apparatus and a method for forming a digital image with use of light intensity modulation in an electrophotographic process.

2. Description of the Prior Art

In a digital printer and the like with use of an electrophotographic process, a laser beam is modulated according to multi-level image data to expose a photoconductor which has been sensitized uniformly, to form an electrostatic latent image. The latent image is developed with toners, and the resultant toner image is transferred to a paper. Thus, the image data is reproduced on the paper.

In this intensity modulation method, the size of laser beam is kept constant. However, the beam size varies with the type of laser diode used for the exposure. In U.S. Pat. application Ser. No. 07/671,963, filed Mar. 19, 1991 the beam size of laser diode is coded, and the coding is performed in a factory before shipment. The beam size (code input) of a laser diode installed in an apparatus is detected, and the gradation correction data is corrected according to the detected beam size.

A latent image formed with the laser beam is an analog image, and the gradation characteristic depends largely on the size of laser beam. The size of laser beam varies with the environment and the like of the electrophotography process. Therefore, it is desirable that gradation characteristic is corrected more precisely according to the beam size.

The beam size can be detected with a detector disclosed for example in Japanese Patent laid open Publication No. 68,358/1985. Usually, the beam size is detected, and a controller changes the beam size in response to the detected beam size (so-called autofocus). However, if such a detector and a controller are installed in a printer, the cost becomes higher. On the other hand, Japanese Patent laid open for Publication No. 25,164/1986 discloses the control of the spot size of the beam by changing the intensity of the beam. This method can control the spot size with a simple structure. However, it cannot control the gradation of a half-tone image appropriately because the potential of a latent image varies with the intensity of the beam.

SUMMARY OF THE INVENTION

An object of the present invention is to provide an apparatus and a method for forming a digital image with use of light intensity modulation in an electrophotographic process, which apparatus and method being able to control the gradation in response to the change of the intensity of the beam intensity.

In an apparatus of the present invention, the intensity of the laser beam is modulated according to multi-level image data on forming a half-tone image on the photoconductor. In order to correct the effect of the beam size on the gradation characteristic, the toner density of a standard toner image are measured. That is, a standard toner image is formed with a beam at a prescribed intermediate intensity, and the toner density of the image is detected. On the other hand, the size of the beam for exposing the photoconductor is measured. Then, the gradation characteristic is controlled according to the toner density and the beam size. The intermediate intensity of the beam is selected as a light intensity at which the reproduced image density is not affected by the beam size. For example, a gradation characteristic data is selected among a plurality of gradation correction data according to the toner density and beam size measured. On the other hand, only one gradation characteristic data is provided, and it may be corrected by a simple calculation according to the toner density and beam size. Thus, the effect of the beam size on the gradation characteristic is corrected.

An advantage of the present invention is that the gradation characteristic can be stabilized against the change of the beam size in the light intensity modulation.

Another advantage of the present invention is that the image quality can be controlled without a beam size automatic control mechanism, but with the beam size measurement.

BRIEF DESCRIPTION OF THE DRAWINGS

These and other objects and features of the present invention will become clear from the following description taken with the preferred embodiments thereof in conjunction with reference to the accompanying drawings, and in which.

DETAILED DESCRIPTION OF THE PREFERRED EMBODIMENTS

Figure 1:
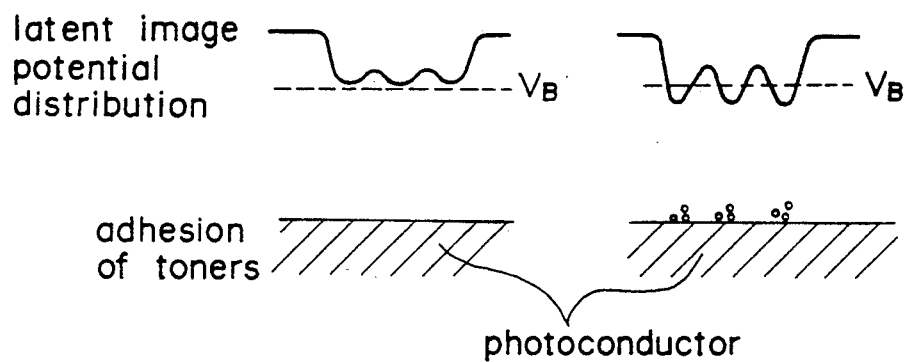
FIG. 1 is a schematic diagram of the distribution of the potential of latent image when the same exposure power but of different beam size is given to a photoconductor.

Referring now to the drawings, wherein like reference characters designate like or corresponding parts throughout the several views, embodiments of the present invention will be explained below in the following order:

(A) Gradation characteristic and beam size
(B) Automatic density control in electrophotographic process of inversion development
(C) Gradation correction
(D) Structure of digital color copying machine
(E) Image signal processing
(F) Laser optical system
(G) Flow of printer control

(A) Gradation characteristic and beam size

The gradation characteristic has to be taken into account for reproducing a half-tone image. In a printer with use of an electrophotographic process, the read level (input level) of an image of a document to be reproduced is not proportional to the intensity level of laser beam (or image density level of reproduced image) generally due to many factors such as the photosensitive characteristic of the photoconductor, the toner characteristic, the environment and the like, and this nonlinearity is called as gamma characteristic or gradation characteristic. The gamma characteristic is a large factor which deteriorates the fidelity in the reproduction of a half-tone image.

In this embodiment, the intensity of the laser beam is modulated according to multi-level image data to expose a photoconductor. The size of laser beam is one of the factors which affects the gradation characteristic. If the beam size becomes larger, an image at low densities becomes harder to be reproduced, and the amount of adhered toners for an image data increases. That is, the initial slope of the gradation characteristic curve at low densities becomes larger. This is a characteristic of forming an electrostatic latent image with the laser intensity modulation method.

FIG. 1 shows two examples of the distribution of the electrical potential of a latent image and of the adhesion of toners to the latent image in an inversion development system, wherein $V_B$ denotes a development bias voltage. In the two examples, the laser beam irradiates three successive dots in the subscan direction at the same power but with a different beam size from each other. The amplitude of the distribution of the latent image potential varies with the beam size. The potential distribution changes logarithmically at positions far from the center. Then, even if the same exposure energy is given, when the beam size becomes narrower, the valley of the potential becomes deeper and the potential distribution becomes more logarithmic. Therefore, toners (expressed as open circles schematically) begin to be adhered at a smaller exposure power, as shown in the right side in FIG. 1 wherein the beam size is narrower. On the contrary, in the left side in FIG. 1 wherein the beam size is thicker, toners do not adhere though the same exposure power is given to the photoconductor.

Figure 2:
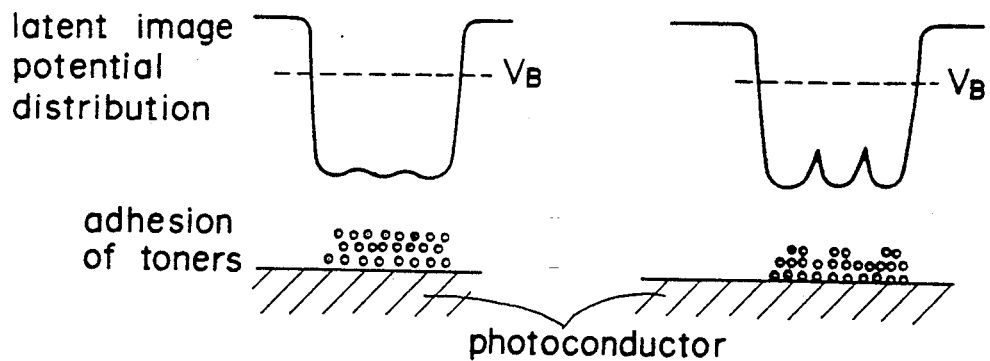
FIG. 2 is a schematic diagram of the distribution of the potential of latent image and the adherence of toners.

FIG. 2 shows a similar situation when a larger exposure power is given to the photoconductor. At the left side of FIG. 2 wherein the beam size is thicker, toners adhere more because the exposure is more uniform. On the contrary, at the right side of FIG. 2 wherein the beam size is narrower, heaps of the latent image potential appear due to the logarithmic distribution. The toner density is lower at the bumps and the total amount of adhered toners becomes smaller.

Figure 3:
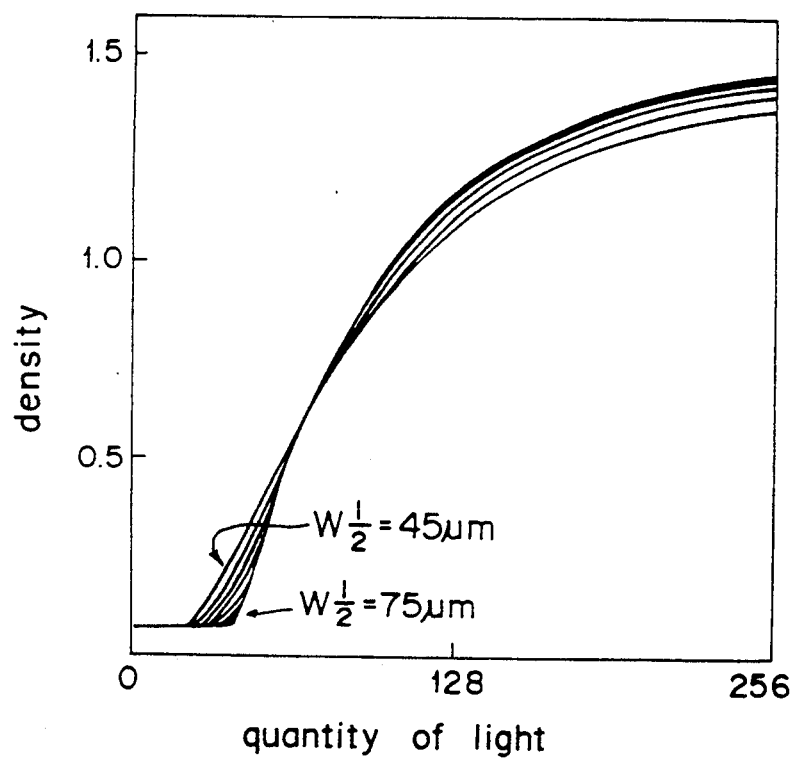
FIG. 3 is a graph of the gradation characteristic when the beam size $W_1$ is changed.

FIG. 3 shows a graph of the gradation characteristic (or the relation of the image density plotted against the exposure amount) when the beam size $W_1$ is changed at seven steps from 45 to 75 μm. The image density changes at a region of lower quantity of light and at a region of higher quantity of light, whereas it does not change at a certain intermediate quantity of light (level 72) irrespective of beam size. If the beam size becomes narrower, the initial slope at the origin of the gradation characteristic curve becomes larger, while the maximum density becomes smaller.

Figure 4:
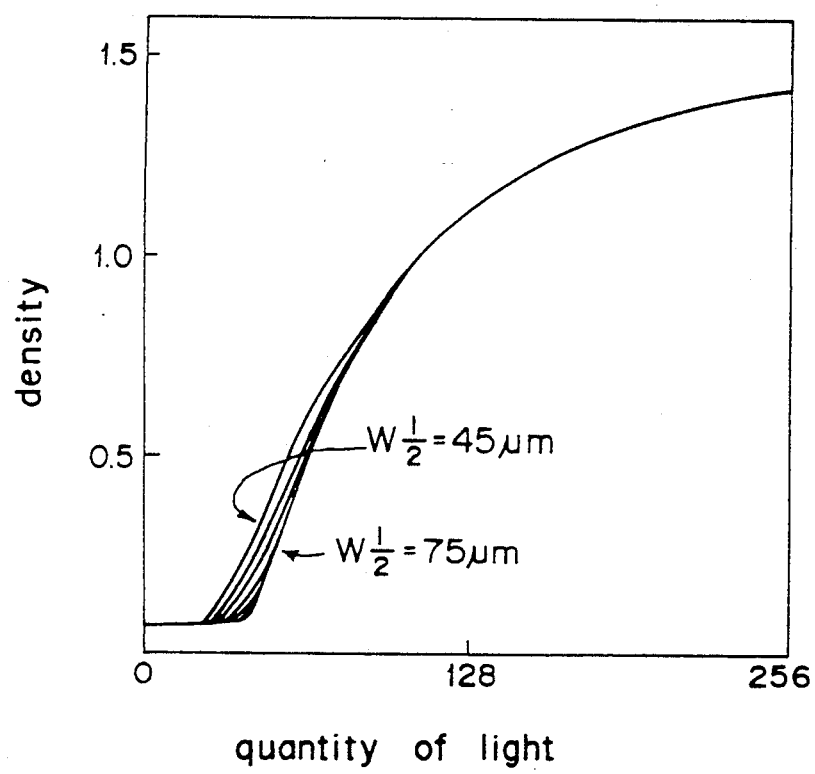
FIG. 4 is a graph of gradation characteristic when the maximum amount of adhered toners is controlled to be constant.

FIG. 4 shows a graph of the gradation characteristic when the maximum amount of adhered toners is controlled to be kept constant with an AIDC sensor as explained below. It is found that the gradation characteristic changes less as expected than in case of FIG. 3, but the initial slope is found to be affected largely by the beam size.

(B) Automatic density control in electrophotographic process of inversion development In the present invention, the gradation characteristic is corrected by detecting the beam size as will be explained below, and this is related closely to the automatic image density control with the AIDC sensor. Next, the automatic image density control is explained.

Figure 5:
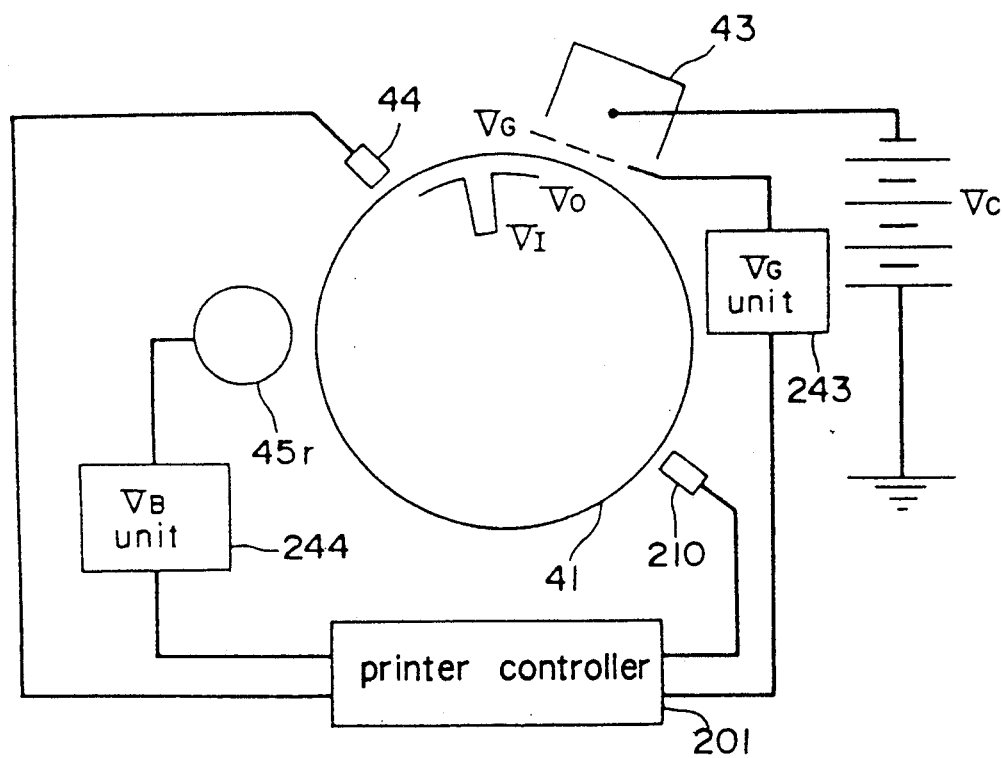
FIG. 5 is a schematic diagram around the photoconductor drum 41.

The automatic density control is explained below with reference to FIG. 5 of a schematic diagram of image forming section including a photoconductor drum 41 and a roller of a development unit 45r of a copying machine shown in detail in FIG. 19. As shown in FIG. 5, a sensitizing charger 43 of grid voltage $V_G$ (discharge voltage $V_C$) is arranged opposite to the photoconductor 41. The negative grid voltage $V_G$ is applied to the grid of the charger 43 by a grid voltage generator 243. The surface potential $V_o$ of the photoconductor just after the sensitization before the exposure can be taken almost equal to the grid voltage $V_G$. Therefore, the surface potential $V_o$ can be controlled by the grid voltage $V_G$. The surface potential $V_o$ is detected by a $V_o$ sensor 44 which is an electrometer.

First, before the exposure of laser beam, a negative surface potential $V_o$ is applied to the photoconductor drum 41 by the sensitizing charger 43, while a negative, lower bias voltage $V_B$ ($|V_B| < |V_o|$) is applied to the roller of the development unit 45r by a development bias voltage generator 244. That is, the surface voltage of the development sleeve is $V_B$.

A laser beam exposes the photoconductor, and the potential at the exposure position decreases from the surface potential $V_o$ to an attenuation potential $V_I$ of the electrostatic latent image or the surface potential just after the laser exposure. If the attenuation potential $V_I$ becomes lower than the development bias voltage $V_B$, toners carried to the surface of the sleeve of the development unit 45r adhere to the photoconductor drum 41. It is not good that the difference between the surface potential $V_o$ and the development bias voltage $V_B$ is too large or too small. Further, the amount of adhered toners increases with increasing the development voltage $\Delta V = |V_B - V_I|$. On the other hand, the attenuation potential $V_I$ changes with the surface potential $V_o$ even at the same quantity of exposure light. Then, for example, the surface potential $V_o$ and the development bias voltage $V_B$ are changed by keeping the difference between the surface potential $V_o$ and the development bias voltage $V_B$ constant. Then, the difference between the development bias voltage $V_B$ and the attenuation potential $V_I$ changes or the amount of adhered toners can be changed to control the density.

This kind of density control is performed to keep the maximum density constant by changing the surface potential $V_o$ and the development bias voltage $V_B$ manually or automatically. In the automatic density control, a standard toner image for the density control is first formed on the surface of the photoconductor drum 41 in an area not used for forming a latent image, and the image reproduction density of the standard toner image is measured by detecting the quantity of reflection light with an AIDC sensor 210 arranged near the photoconductor drum 41. The value detected by the AIDC sensor 210 is received by a printer controller 201, which drives the $V_G$ generator 243 and the $V_B$ generator 244 according to the detected value. The standard image is formed at an intermediate density level by taking into account that the AIDC sensor 210 can detect toners between 0 and 0.9 mg/cm², and the intermediate density level is determined with a first or second method for gradation correction, as will be explained next.

(C) Gradation correction

In this invention, two kinds of gradation correction methods are used to compensate the change in beam size.

In the first method, the development efficiency and the beam size are corrected separately. That is, the effect of the development efficiency is corrected with the grid voltage $V_G$ and the development bias voltage $V_B$, while the effect of the beam size is corrected in the optical system. The development efficiency is defined as a ratio of the amount of adhered toners to the development voltage. A detection pattern for the AIDC sensor is formed in a condition wherein the gradation characteristic is not affected by the beam size (level 72 in an example of FIG. 3). This condition is determined by the grid voltage $V_G$, the development bias voltage $V_B$, the laser power and the photoconductor sensitivity. This method can correct the gradation characteristic precisely because each factor to be dealt with is corrected separately.

Figure 6:
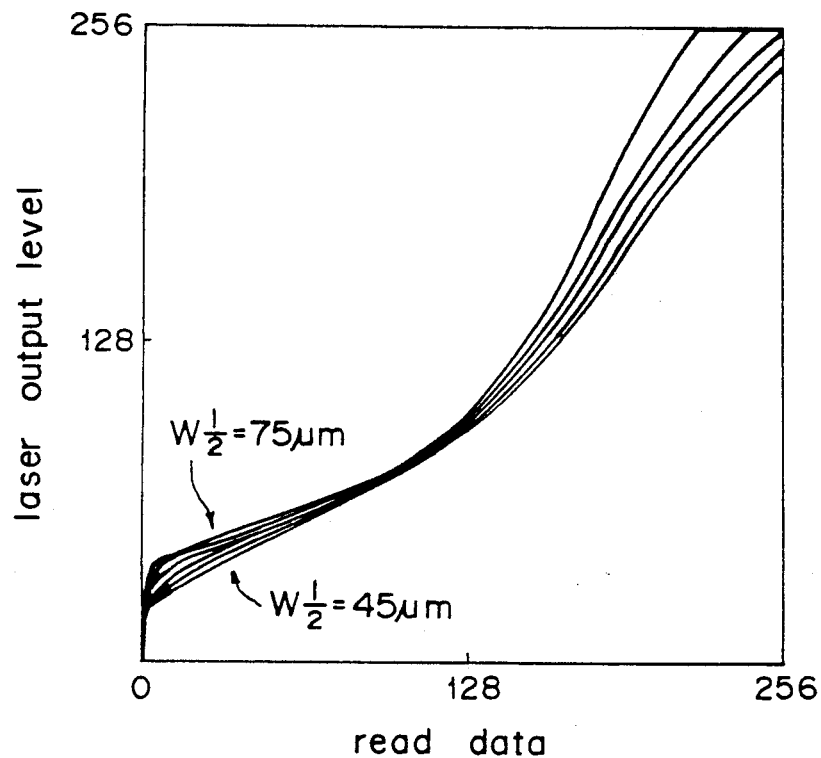
FIG. 6 is a graph of the gradation characteristic when a first gradation correction method is used.

On the other hand, it has a disadvantage that the change of the gamma correction table cannot be simplified with use of a simple shift technique or the like. Further, if the beam size is narrow, the amount of adhered toners may not be corrected because the maximum amount of adhered toners decreases. FIG. 6 displays gradation correction curves in this situation. When the beam size (half-width $W_{\frac{1}{2}}$) is narrower, the maximum read density becomes lower than the maximum 256 and the gradation number or the dynamic range decreases largely.

Figure 7:
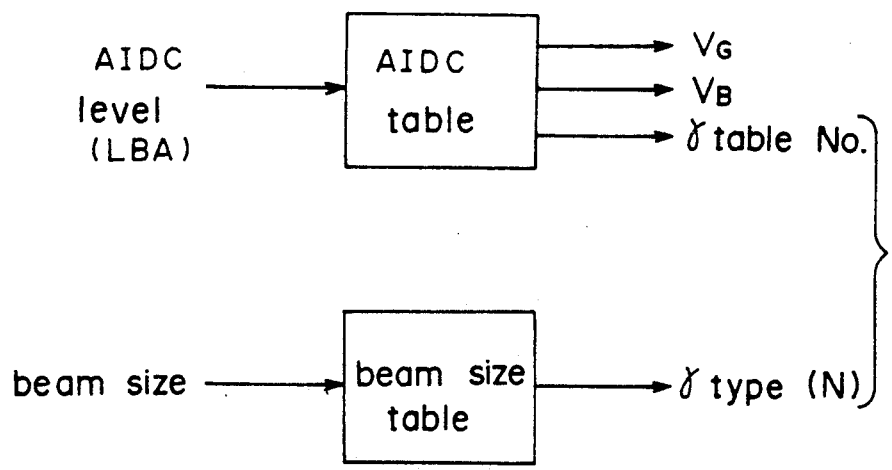
FIG. 7 is a diagram which shows the first gradation correction method of the present invention.

FIG. 7 displays the first gradation control method in concrete. An AIDC level (LBA) is determined from the amount of adhered toners detected by the AIDC sensor 210, as displayed in an AIDC table (Table 1). Then, the development bias voltage $V_B$ and the grid voltage $V_G$ are determined to control the development efficiency by using the AIDC table. Further, a gamma correction table number (T0-T11) for gradation correction is also determined by using the AIDC table in correspondence to the amount of adhered toners. On the other hand, a gamma type (N=1-6) is determined from the beam size measured by using a beam size table (Table 2). Finally, a gamma correction table is selected according to the gamma correction table number T0-T11 and the gamma type (N). Gamma correction tables T0(N)-T11(N) (N=1-6) are provided in a memory in the copying machine,

TABLE 1

| | | AIDC Table | | | | | |
|---|---|---|---|---|---|---|---|
| density detection level (LBA) | amount of adhered toners (mg/cm²) | development efficiency | $\Delta V_d$ [V] | $V_G$ [V] | $V_o$ [V] | $V_B$ [V] | γ correction table |
| 0 | 0.625 | 0.00625 | 160 | 500 | 480 | 280 | T0 (N) |
| 1 | 0.510 | 0.00510 | 195 | 540 | 520 | 320 | T1 (N) |
| 2 | 0.455 | 0.00455 | 220 | 570 | 545 | 345 | T2 (N) |
| 3 | 0.410 | 0.00410 | 245 | 600 | 570 | 370 | T3 (N) |
| 4 | 0.385 | 0.00385 | 260 | 630 | 590 | 390 | T4 (N) |
| 5 | 0.345 | 0.00345 | 290 | 660 | 620 | 420 | T5 (N) |
| 6 | 0.310 | 0.00310 | 320 | 700 | 650 | 450 | T6 (N) |
| 7 | 0.280 | 0.00280 | 355 | 740 | 690 | 490 | T7 (N) |
| 8 | 0.260 | 0.00260 | 385 | 780 | 720 | 520 | T8 (N) |
| 9 | 0.240 | 0.00240 | 420 | 830 | 760 | 560 | T9 (N) |
| 10 | 0.210 | 0.00210 | 480 | 900 | 820 | 620 | T10 (N) |
| 11 | 0.180 | 0.00180 | 560 | 1000 | 910 | 710 | T11 (N) |

TABLE 2

| beam size table | |
|---|---|
| $W_{\frac{1}{2}}$ | gamma table selection code (N) |
| 45–49 | 1 |
| 50–54 | 2 |
| 55–59 | 3 |
| 60–64 | 4 |
| 65–69 | 5 |
| 70 or more | 6 |

As shown in Table 1, the detection value of the AIDC sensor 210 is classified to density detection levels (LBA) 0-11 displayed in the left-most column according to the amplitude of the detection value of adhered toners. According to the density detection level LBA, the grid voltage $V_G$ is changed from 500 V to 1000 V and the development bias voltage $V_B$ is changed from 280 to 710 V. Table 1 shows an example of combinations ($V_B$, $V_o$) of the bias voltage $V_B$ of the development unit 45a-45d and the surface potential $V_o$ on the photoconductor drum 41. Though the development voltage $V_B$ is negative in this embodiment, it is expressed as absolute value for simplicity. In Table 1, "detected amount of adhered toners" is the amount of adhered toners measured with the AIDC sensor 210 on the standard toner image formed in the standard image-forming conditions, and "development efficiency" is defined as a ratio of the detected amount of toners to the development voltage. Further, the development voltage $\Delta Vd$ needed to realize a desired amount of adhered toners, called as prescribed development voltage, is defined as a ratio of the desired amount to the development efficiency.

Figure 8:
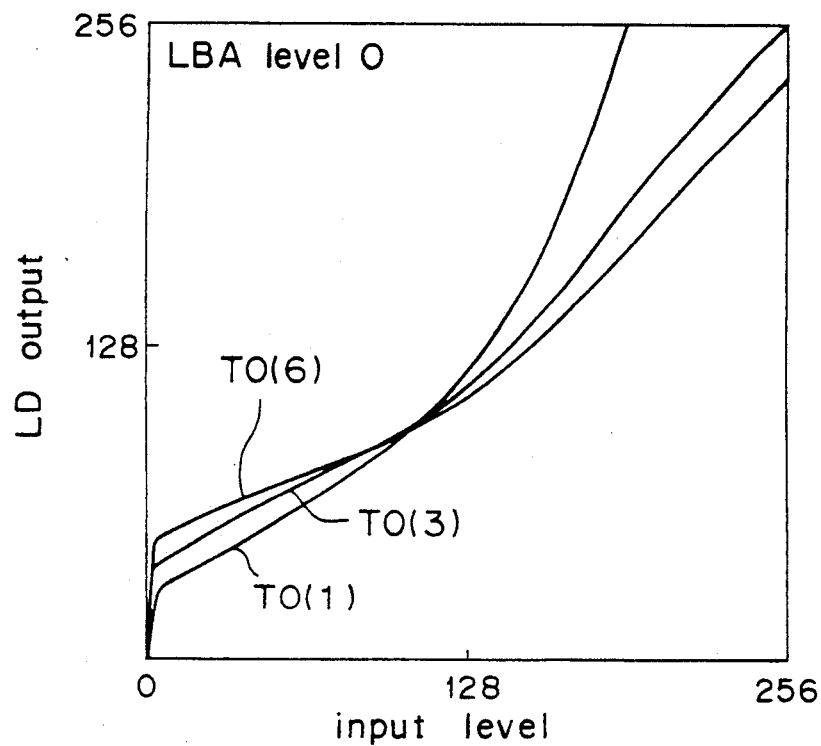
FIG. 8 is a graph of examples of gamma correction tables in correspondence to three beam sizes for 0 of LBA level.
Figure 9:
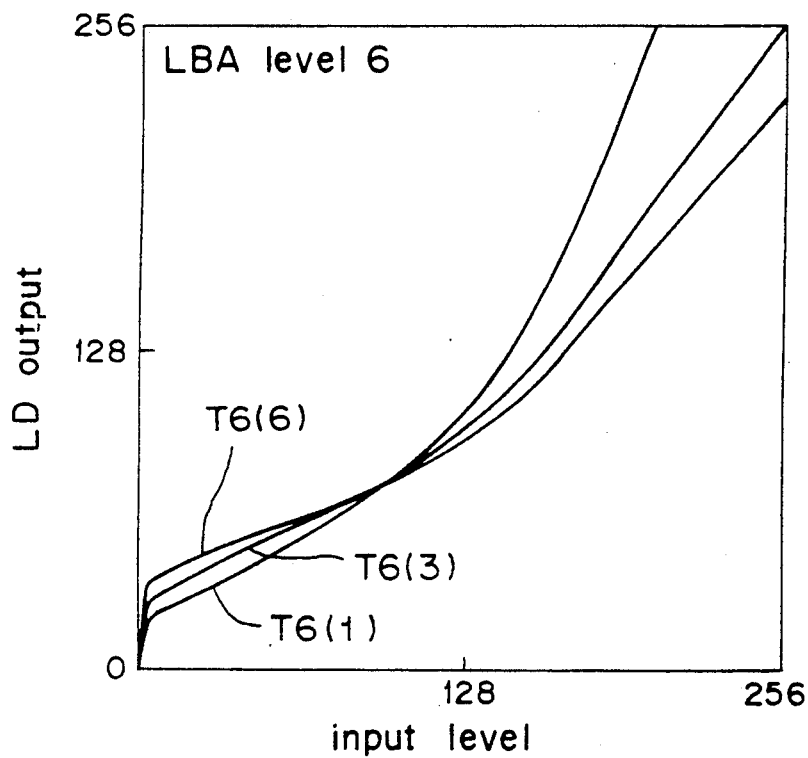
FIG. 9 is a graph of examples of gamma correction tables in correspondence to three beam sizes for 6 of LBA level.
Figure 10:
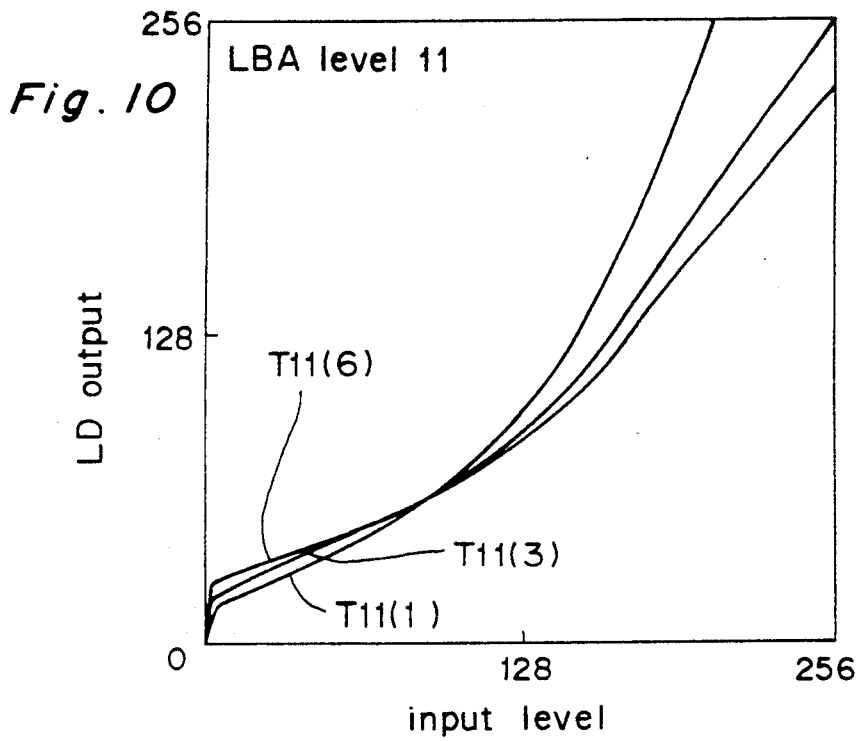
FIG. 10 is a graph of examples of gamma correction tables in correspondence to three beam sizes for 11 of LBA level.

FIGS. 8, 9 and 10 show examples of the gamma correction tables in correspondence to three beam sizes (gamma types) for 0, 6 and 11 of LBA level. They illustrate clearly that the gamma characteristic varies largely with beam size.

Next, a modified example of the first method is explained. Gamma correction tables selected with the AIDC sensor 210 shift roughly in parallel to each other. Then, the gamma type may be determined from the detected beam size (N) and only six gamma correction tables are provided in correspondence to the six different beam sizes. A gamma correction shift value (G) may be determined from the AIDC level (LBA). The gamma correction shift value (G) is added to a read value in a gamma correction table selected according to the beam size, and the shift value is determined so as to represent the gradation characteristic suitably. Table 3 shows an example of the AIDC level and the gamma correction shift value (G).

Figure 11:
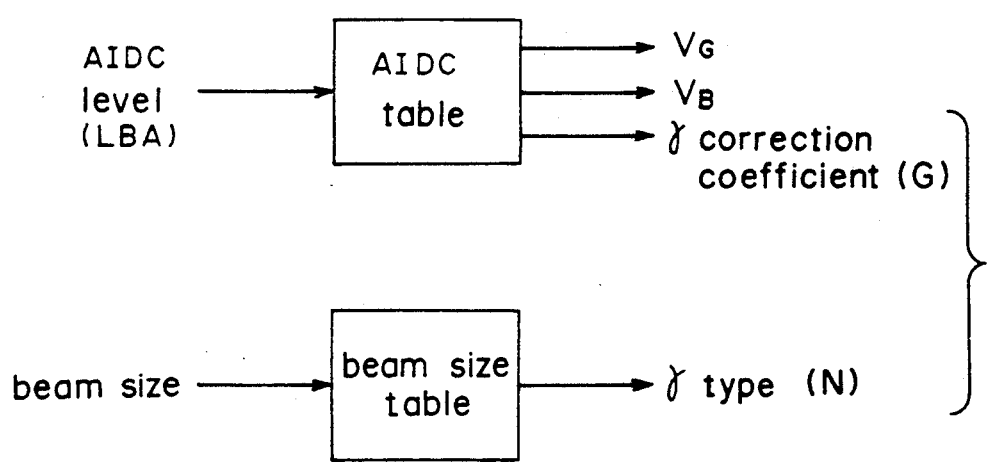
FIG. 11 is a diagram which shows a modified example of the first gradation correction method of the present invention.

As shown in FIG. 11, by using Table 3, the detected amount of adhered toners with the AIDC sensor 210 determines the AIDC level (LBA), which in turn determines the development bias voltage $V_B$, the grid voltage $V_G$ and the gamma correction shift value G for gamma correction. On the other hand, the beam size measured determines the gamma type (N) by using the beam size table (refer Table 2). Then, only six basic gamma correction tables are needed, and the memory capacity for the gamma correction tables can be reduced to a large extent. The gamma correction value (light emission level) is determined by adding the shift value G to the gamma correction table selected according to the beam size.

In a modified example, a gamma correction value is determined for a read level x from the gamma correction table function $y=f_N(x)$ in correspondence to the gamma type (N) and the shift value G as explained below. A whole range 0–255 of the read level x is divided into three sections and a gamma correction curve y is approximated as a line in each of the three sections defined by boundary values $x_A$ and $x_B$.

$0 \leq x \leq x_A$: $y = x * (f_N(x_A) + G) / x_A$.

$x_A \leq x \leq x_B$: $y = f_N(x) + G$.

$x_B \leq x \leq 255$: $y = f_N(x_B) + G + (255 - f_N(x_B)) * (x - x_B) / (255 - x_B)$.

Preferably, coefficients obtained by using input data from an operational panel or from other sensors may be added to determine the gamma shift value G.

Figure 12:
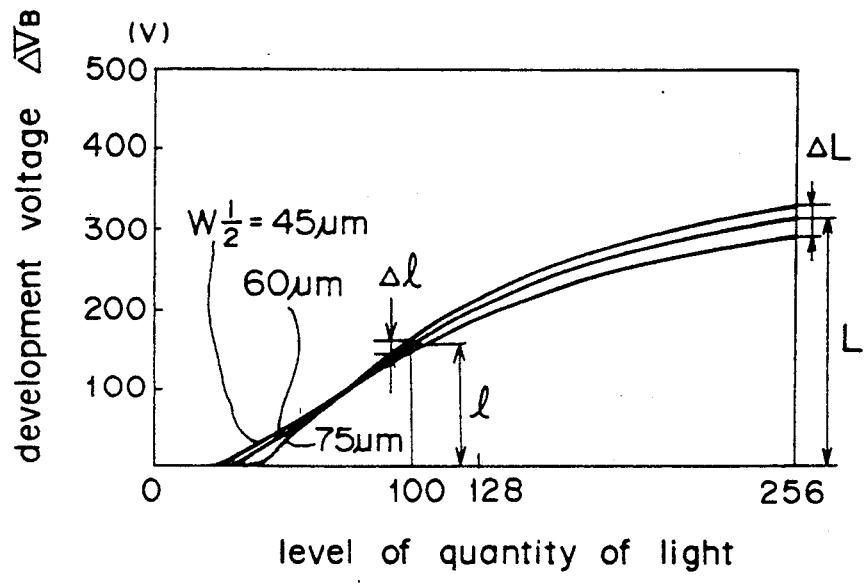
FIG. 12 is a diagram for explaining the condition that the effect of the beam size is of the same order as the effect of development efficiency.
Figure 13:
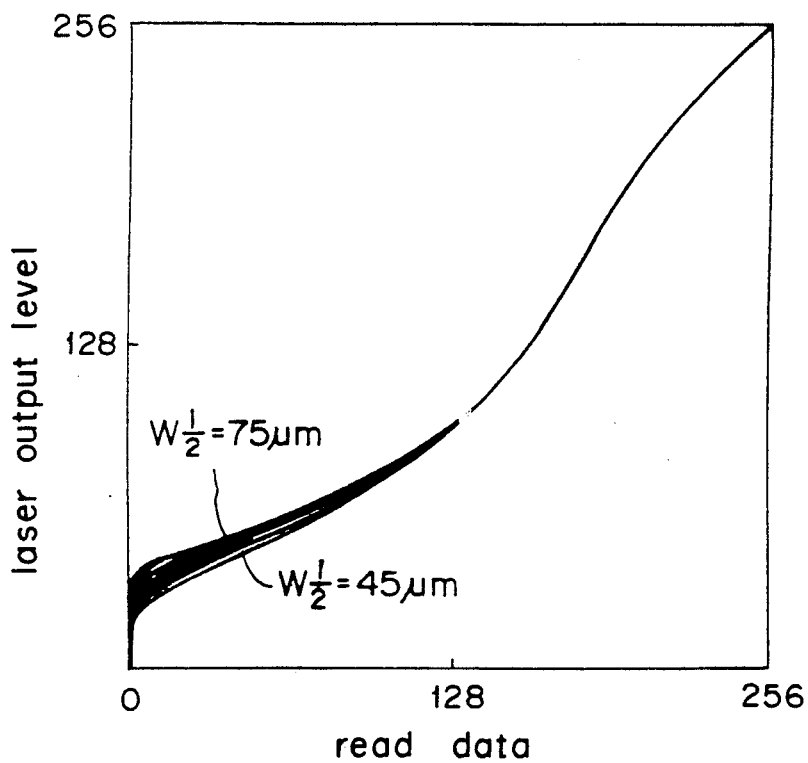
FIG. 13 is a graph of gamma correction curves when the second gradation correction method is used.

Next, the second gradation correction method is explained. In this method, the gradation characteristic is corrected by taking the beam size dependence of the amount of adhered toners and the development efficiency into account simultaneously. The detection pattern for forming a standard toner image is prepared at an intermediate level of the quantity of light at which the effect of beam size is of the same order as that at the maximum light quantity level. FIG. 12 shows the development voltage $\Delta V_B$ plotted against the level of the quantity of light. It is to be noted that there is an intermediate level (say 100) at which $\Delta l/l = \Delta L/L$, wherein l denotes the development voltage at the level, $\Delta l$ denotes the change thereof due to beam size at the level l, L denotes the development voltage at the maximum level and $\Delta L$ denotes the change thereof due to beam size at the level L. FIG. 13 shows gamma correction curves in this condition.

TABLE 3

| | AIDC table | | | | | | |
|---|---|---|---|---|---|---|---|
| density detection level (LBA) | amount of adhered toners (mg/-cm²) | development efficiency | $\Delta Vd$ [V] | $V_G$ [V] | $V_o$ [V] | $V_B$ [V] | γ correction shift value (G) |
| 0 | 0.625 | 0.00625 | 160 | 500 | 480 | 280 | +20 |
| 1 | 0.510 | 0.00510 | 195 | 540 | 520 | 320 | +16 |
| 2 | 0.455 | 0.00455 | 220 | 570 | 545 | 345 | +12 |
| 3 | 0.410 | 0.00410 | 245 | 600 | 570 | 370 | +8 |
| 4 | 0.385 | 0.00385 | 260 | 630 | 590 | 390 | +4 |
| 5 | 0.345 | 0.00345 | 290 | 660 | 620 | 420 | 0 |
| 6 | 0.310 | 0.00310 | 320 | 700 | 650 | 450 | −4 |
| 7 | 0.280 | 0.00280 | 355 | 740 | 690 | 490 | −7 |
| 8 | 0.260 | 0.00260 | 385 | 780 | 720 | 520 | −11 |
| 9 | 0.240 | 0.00240 | 420 | 830 | 760 | 560 | −14 |
| 10 | 0.210 | 0.00210 | 480 | 900 | 820 | 620 | −17 |
| 11 | 0.180 | 0.00180 | 560 | 1000 | 910 | 710 | −20 |

TABLE 4

| | AIDC table | | | | | | |
|---|---|---|---|---|---|---|---|
| density detection level LBA | detected amount of adhered toners (mg/cm²) | development efficiency | $\Delta Vd$ [V] | $V_G$ [V] | $V_o$ [V] | $V_B$ [V] | γ correction coefficient (G) |
| 0 | 0.937 | 0.00625 | 160 | 500 | 480 | 280 | +20 |
| 1 | 0.765 | 0.00510 | 195 | 540 | 520 | 320 | +16 |
| 2 | 0.682 | 0.00455 | 220 | 570 | 545 | 345 | +12 |
| 3 | 0.615 | 0.00410 | 245 | 600 | 570 | 370 | +8 |
| 4 | 0.578 | 0.00385 | 260 | 630 | 590 | 390 | +4 |
| 5 | 0.517 | 0.00345 | 290 | 660 | 620 | 420 | 0 |
| 6 | 0.465 | 0.00310 | 320 | 700 | 650 | 450 | −4 |
| 7 | 0.420 | 0.00280 | 355 | 740 | 690 | 490 | −7 |
| 8 | 0.390 | 0.00260 | 385 | 780 | 720 | 520 | −11 |
| 9 | 0.360 | 0.00240 | 420 | 830 | 760 | 560 | −14 |
| 10 | 0.315 | 0.00210 | 480 | 900 | 820 | 620 | −17 |
| 11 | 0.270 | 0.00180 | 560 | 1000 | 910 | 710 | −20 |

TABLE 5

| Beam size table | |
|---|---|
| $w_i$ | correction coefficient (BG) |
| 45–49 | −7 |
| 50–54 | −4 |
| 55–59 | 0 |
| 60–64 | +4 |
| 65–69 | +8 |
| 70 or more | +16 |

This method has an advantage that a simple correction method such as a simple addition of shift values can be used because gamma correction tables are similar to each other. The correction is satisfactory at low densities. On the other hand, the correction is not complete because the effects of the beam size and of the development coefficient are not corrected separately.

Figure 14:
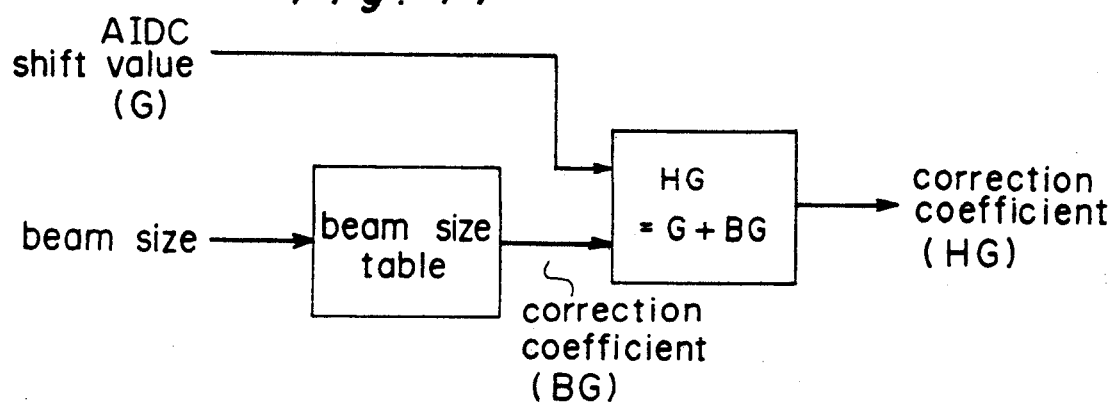
FIG. 14 is a diagram which shows a second gradation correction method of the present invention.

In an example of this method, only one gamma correction curve, that is, a standard gamma correction table for example T6 in correspondence to LBA level 7, is stored in a data ROM 203. In other words, all gamma correction tables in correspondence to the LBA levels are not needed to be stored in the data ROM 203. Gamma correction tables for the other LBA levels can be obtained by adding appropriate shift values to the standard gamma correction table T6. As shown in FIG. 14, a gamma correction coefficient G is determined from the measured value with the AIDC sensor 201 or from the LBA level (refer Table 4). On the other hand, a table correction coefficient BG is determined from the beam size table shown in Table 5. A correction coefficient HG is determined as a sum of the two correction coefficients (shift values) G and BG. That is, HG=H+BG. The gamma correction curve is shifted by the correction coefficient HG.

Figure 15:
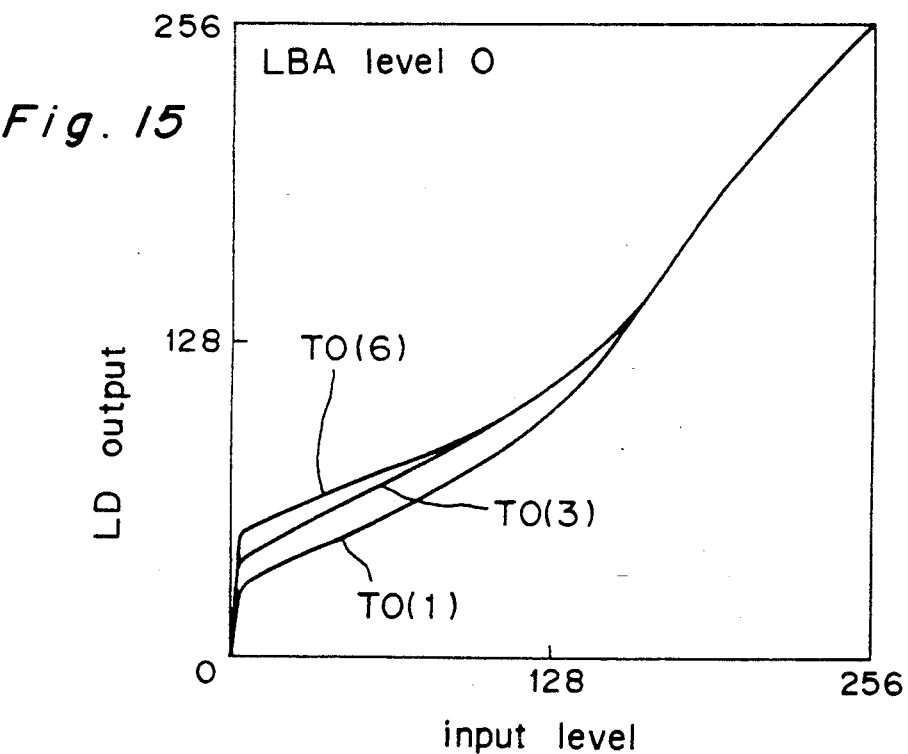
FIG. 15 is a graph of examples of gamma correction tables in correspondence to three beam sizes for 0 of LBA level.
Figure 16:
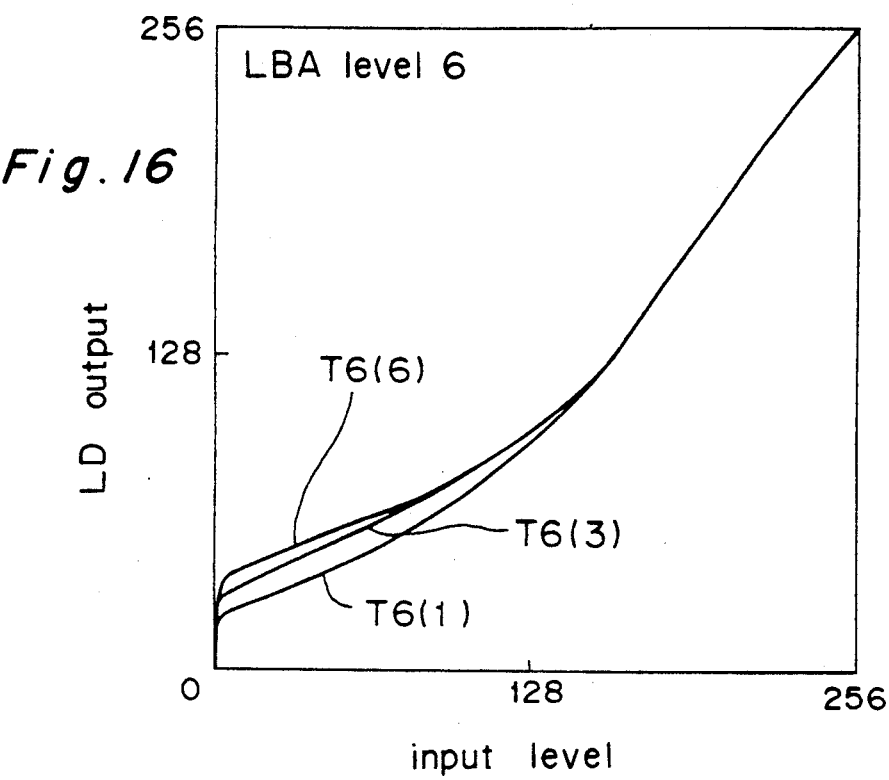
FIG. 16 is a graph of examples of gamma correction tables in correspondence to three beam sizes for 6 of LBA level.
Figure 17:
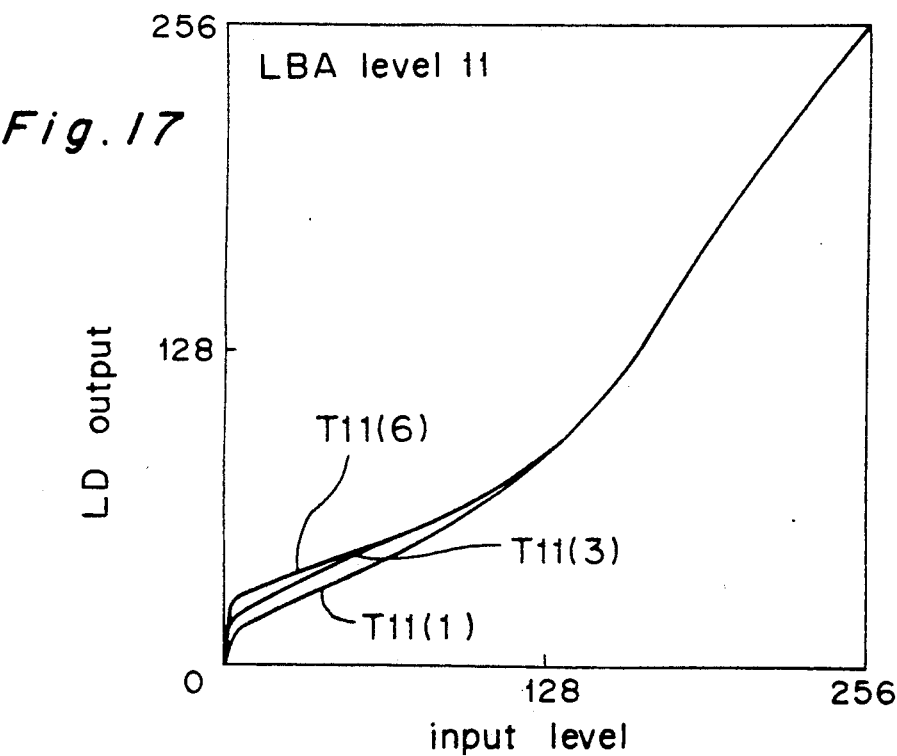
FIG. 17 is a graph of examples of gamma correction tables in correspondence to three beam sizes for 11 of LBA level.

FIGS. 15, 16 and 17 show examples of gamma correction tables in correspondence to three beam sizes (gamma types) for 0, 6 and 11 of LBA level. They show clearly that the gamma characteristic varies largely with beam size.

Figure 18:
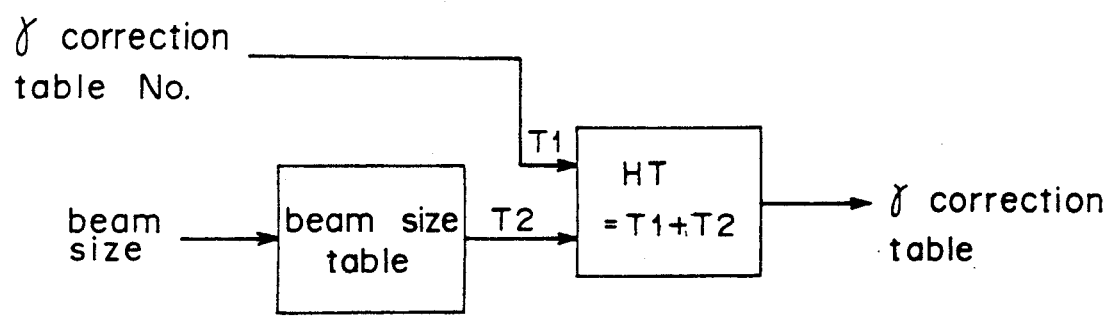
FIG. 18 is a diagram of a modified example of the second gradation control method.

Next, another example of the second method is explained. In this method, a gamma correction table is selected as shown in FIG. 18. Twelve gamma correction tables T0–T11 are provided for the AIDC level (T1), and they are used if the beam size has a standard value. The amount of adhered toners detected with the AIDC sensor 210 is used to determine a gamma correction table number T1 (refer Table 6). On the other hand, the measured beam size is used to determine a table correction code T2 from a beam size table (Table 7). The sum HT of T1 and T2 is used to select a gamma correction.

TABLE 6

AIDC Table

| density detection level (LBA) | amount of adhered toners (mg/cm$^2$) | development efficiency | $\Delta V_d$ [V] | $V_G$ [V] | $V_o$ [V] | $V_B$ [V] | T1 |
|---|---|---|---|---|---|---|---|
| 0 | 0.625 | 0.00625 | 160 | 500 | 480 | 280 | 0 |
| 1 | 0.510 | 0.00510 | 195 | 540 | 520 | 320 | 1 |
| 2 | 0.455 | 0.00455 | 220 | 570 | 545 | 345 | 2 |
| 3 | 0.410 | 0.00410 | 245 | 600 | 570 | 370 | 3 |
| 4 | 0.385 | 0.00385 | 260 | 630 | 590 | 390 | 4 |
| 5 | 0.345 | 0.00345 | 290 | 660 | 620 | 420 | 5 |
| 6 | 0.310 | 0.00310 | 320 | 700 | 650 | 450 | 6 |
| 7 | 0.280 | 0.00280 | 355 | 740 | 690 | 490 | 7 |
| 8 | 0.260 | 0.00260 | 385 | 780 | 720 | 520 | 8 |
| 9 | 0.240 | 0.00240 | 420 | 830 | 760 | 560 | 9 |
| 10 | 0.210 | 0.00210 | 480 | 900 | 820 | 620 | 10 |
| 11 | 0.180 | 0.00180 | 560 | 1000 | 910 | 710 | 11 |

TABLE 7

Beam size table

| $W_{\frac{1}{2}}$ | table correction code (T2) |
|---|---|
| 45–49 | +2 |
| 50–54 | +1 |
| 55–59 | 0 |
| 60–64 | −1 |
| 65–69 | −2 |
| 70 or more | −3 |

If the beam size deviates from the standard value, the selection of the gamma correction table is corrected according to the table correction code T2 or the gamma correction table is selected by using the HT value.

(D) Structure of digital color copying machine

Figure 19:
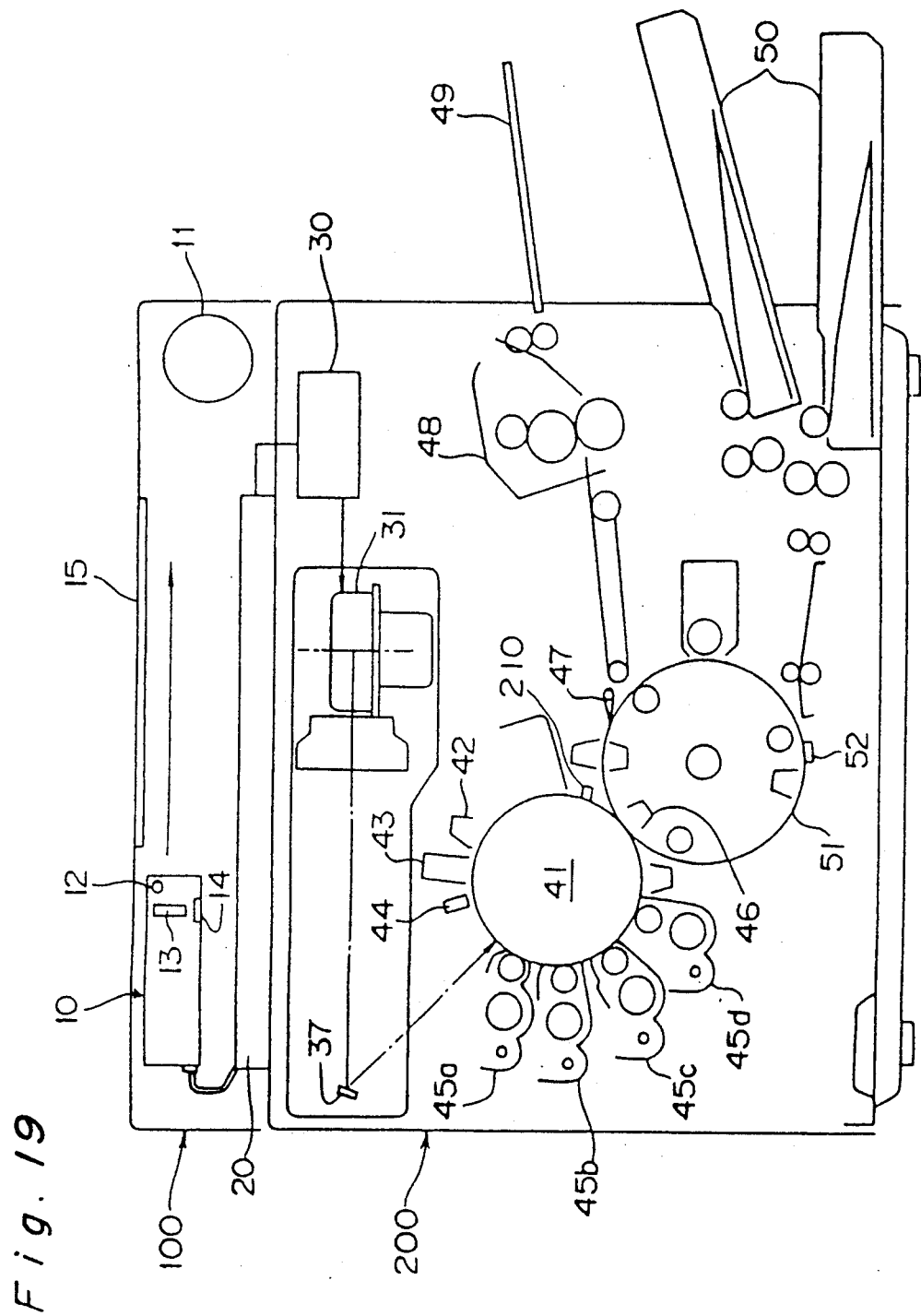
FIG. 19 is a sectional view of a digital color copying machine.

FIG. 19 shows a schematic structure of a digital color copying machine which consists mainly of an image reader 100 for reading a document image and a printer 200 for reproducing the document image.

In the image reader 100, a scanner includes an exposure lamp 12, a rod lens array 13 to collect reflection light from a document put on a platen 15 and a contact type CD color image sensor 14 to convert the collected light to an electric signal. The scanner 10 is driven by a motor 11 to move in the direction (subscan direction) of the arrow shown in FIG. 19. The optical image of the document illuminated by the exposure lamp 12 is converted by the image sensor 14 into a multi-level electric signal of red (R), green (G) and blue (B). The electric signal is converted by the image signal processor 20 to gradation data of yellow (Y), magenta (M), cyan (C) or black (K).

Then, in the printer 200, a print head 31 performs the above-mentioned gamma correction of the gradation data and a dither processing if necessary, and it converts the corrected data to a digital drive signal to drive a laser diode 264 (FIG. 23) in the print head 31.

A laser beam emitted from the laser diode 264 at an intensity in correspondence to the gradation data exposes a photoconductor drum 41 driven to be rotated, via a reflection mirror 37 as shown with a dot and dash line. Thus, a latent image of the document is formed on the photoconductor of the drum 41. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a–45d of yellow, magenta, cyan and black toners is selected to develop the latent image. The developed image is transferred by a transfer charger 46 to a paper wound on a transfer drum 51.

The above-mentioned printing process is repeated four times for yellow, magenta, cyan and black. Then, the paper is isolated from the transfer drum 51 with the operation of an isolation claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 20:
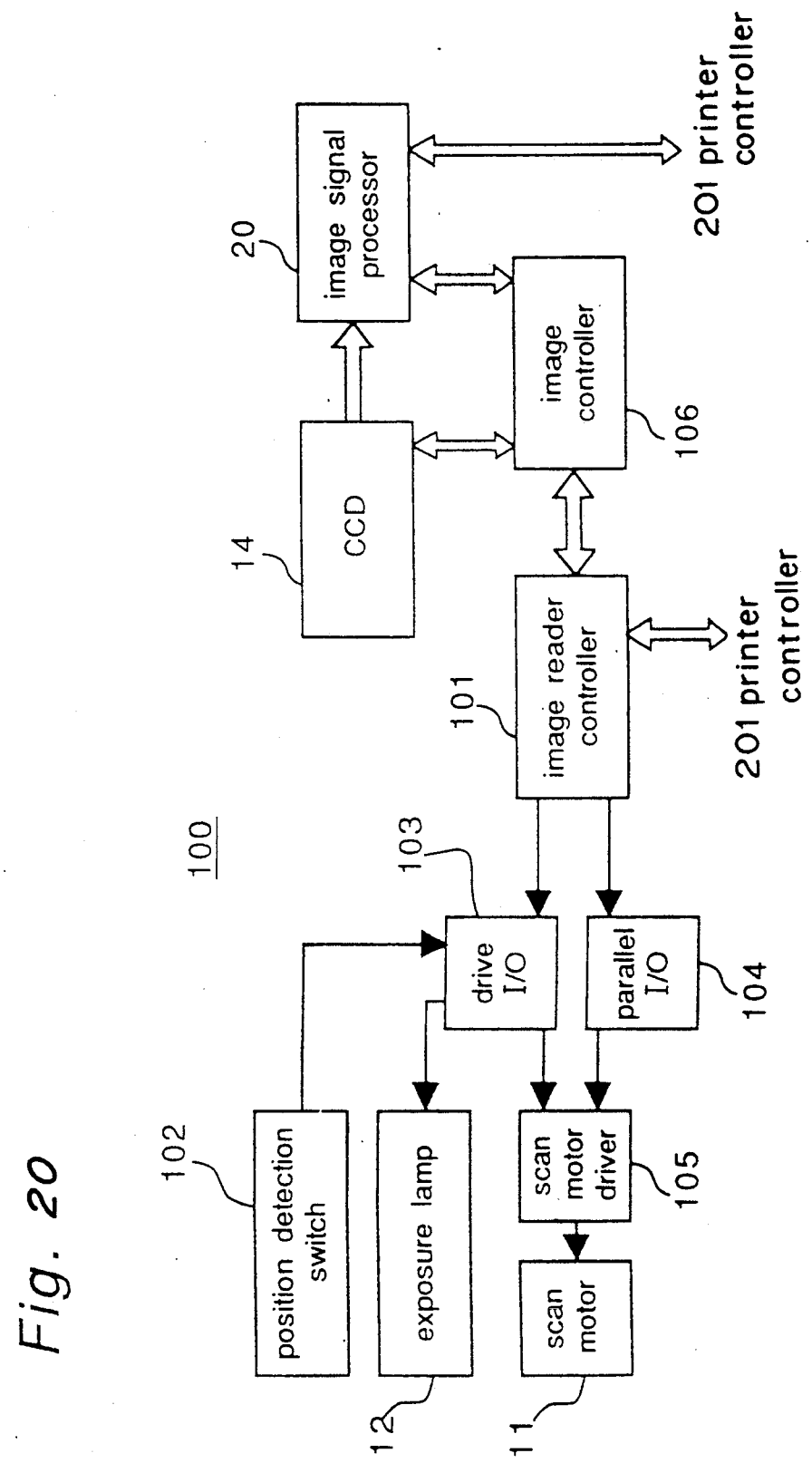
FIG. 20 is a block diagram of a part of the control system of the copying machine.
Figure 21:
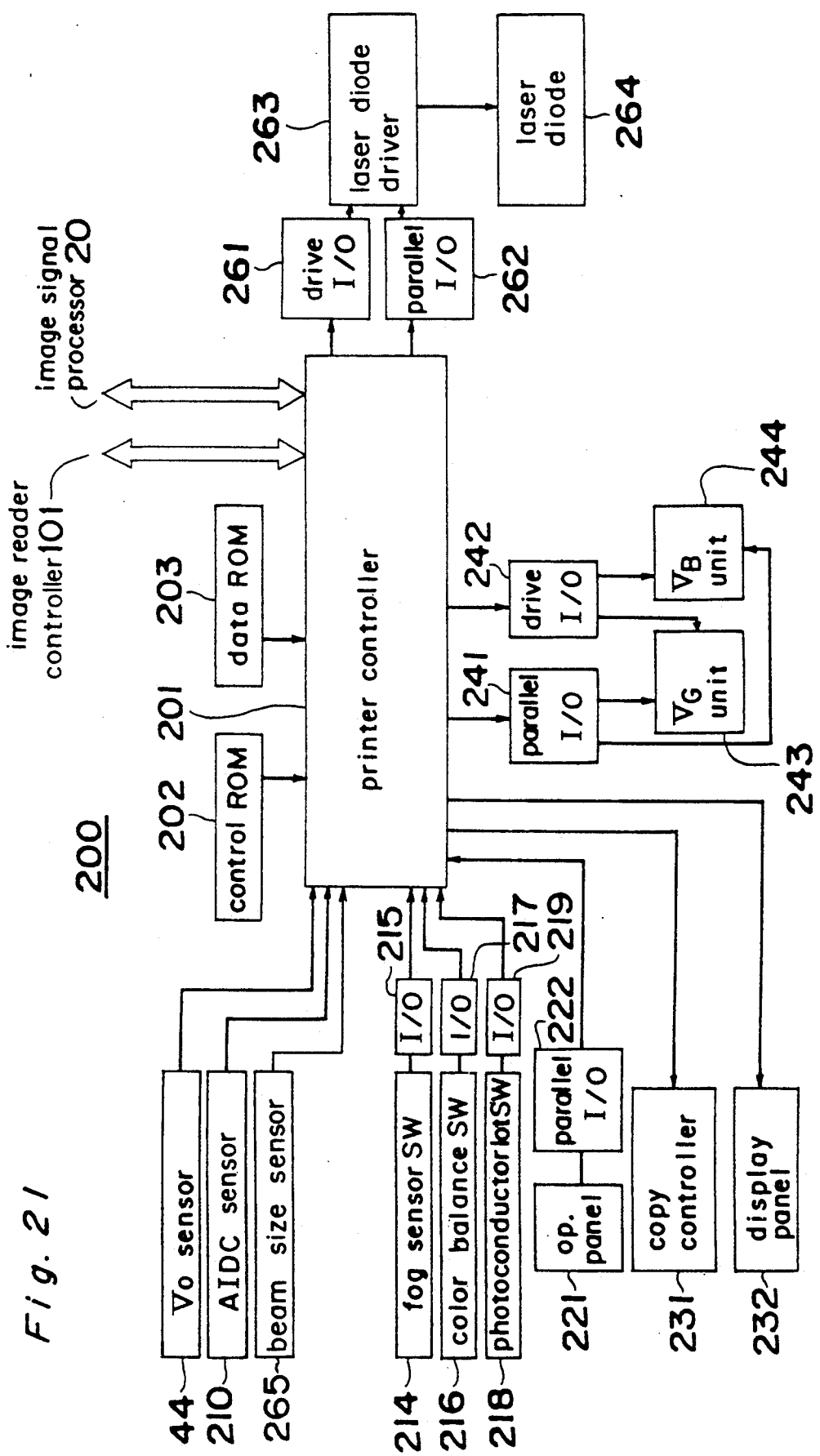
FIG. 21 is a block diagram of the other part of the control system of the copying machine.

FIGS. 20 and 21 show a block diagram of the control system of the digital color machine. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O 103. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

The printer section 200 includes the printer controller 201 for controlling the copying action. The printer controller 201 including a CPU is connected to a control ROM 202 storing a control program and a data ROM 203 storing various data including gamma correction tables. The printer controller 201 receives analog signals from the $V_0$ sensor 44, the AIDC sensor 210 and the beam size sensor 265. Various key-input data with an operational panel 221 are received by the printer controller 201 via a parallel I/O 222. The printer controller 201 controls a copying controller 231 and a display panel 232 according to the data from the operational panel 221 and the data ROM 203. Further, it also controls high voltage units 243 and 244 for generating the grid voltage $V_G$ of the sensitizing charger 43 and for generating the development bias voltage $V_B$ of the development unit 45a–45d.

The print head controller 201 is also connected to the image signal processor 20 of the image reader 100 via an image data bus and performs gamma correction on the basis of the image signal received via the image data bus with reference to the data ROM 203. Then, the print head controller 201 controls the laser diode driver 263 via the drive I/O 261 and a parallel I/O 262, and the laser diode controller 220 controls the emitting of the laser diode 264. The gradation is expressed by modulating the light intensity of the laser beam emitted from the laser diode 264.

(E) Image signal processing

Figure 22:
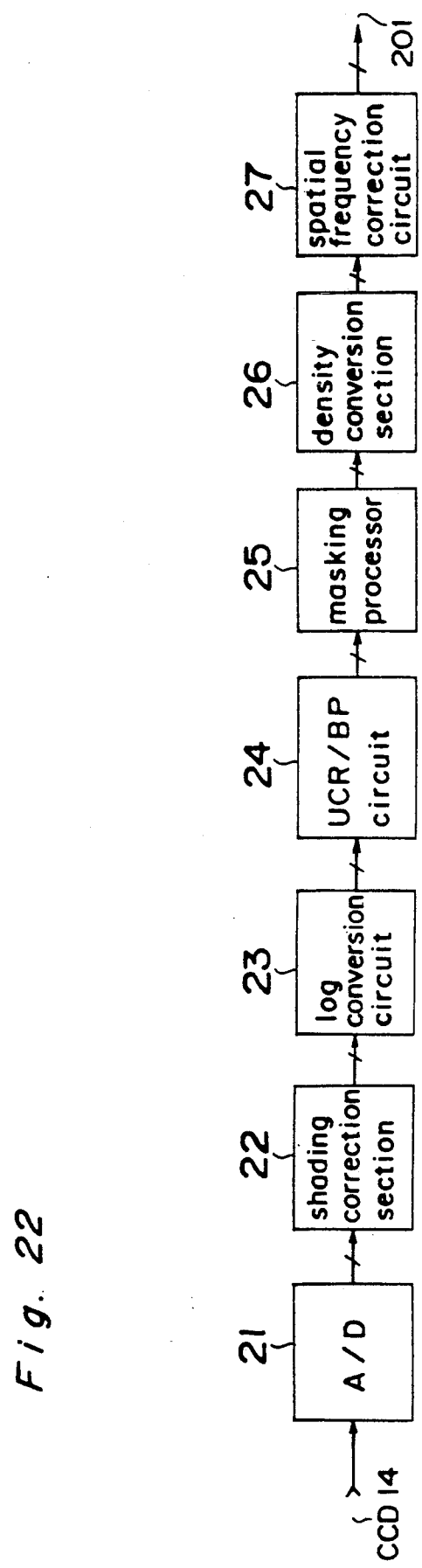
FIG. 22 is a block diagram of image signals in the image signal processor.

FIG. 22 shows a flow of image data processing in the image signal processor 20, wherein the output data of the CCD sensor 14 is processed to send gradation data.

In the image signal processor 20, the image signal obtained by the photoelectric conversion by the CCD sensor 14 is converted to multi-value digital image data of R, G and B by an A/D converter 21. The converted image data is subjected to shading correction by a shading correction section 22, and then the image data is converted to density data according to logarithmic conversion by a log conversion circuit 23. Further, an excess black is removed from the R, G, B density data and a true black data K' is generated from the density data by an under color remove/black painting circuit 24. Then, the R, G, B density data are converted to data of cyan (C), magenta (M) and yellow (Y) by a masking processor 25. Then, the C, M, Y data are multiplied with correction coefficients by a density conversion section 26 and further corrected by a spatial frequency correction circuit 27. The processed data are sent next to the printer controller 201.

Figure 23:
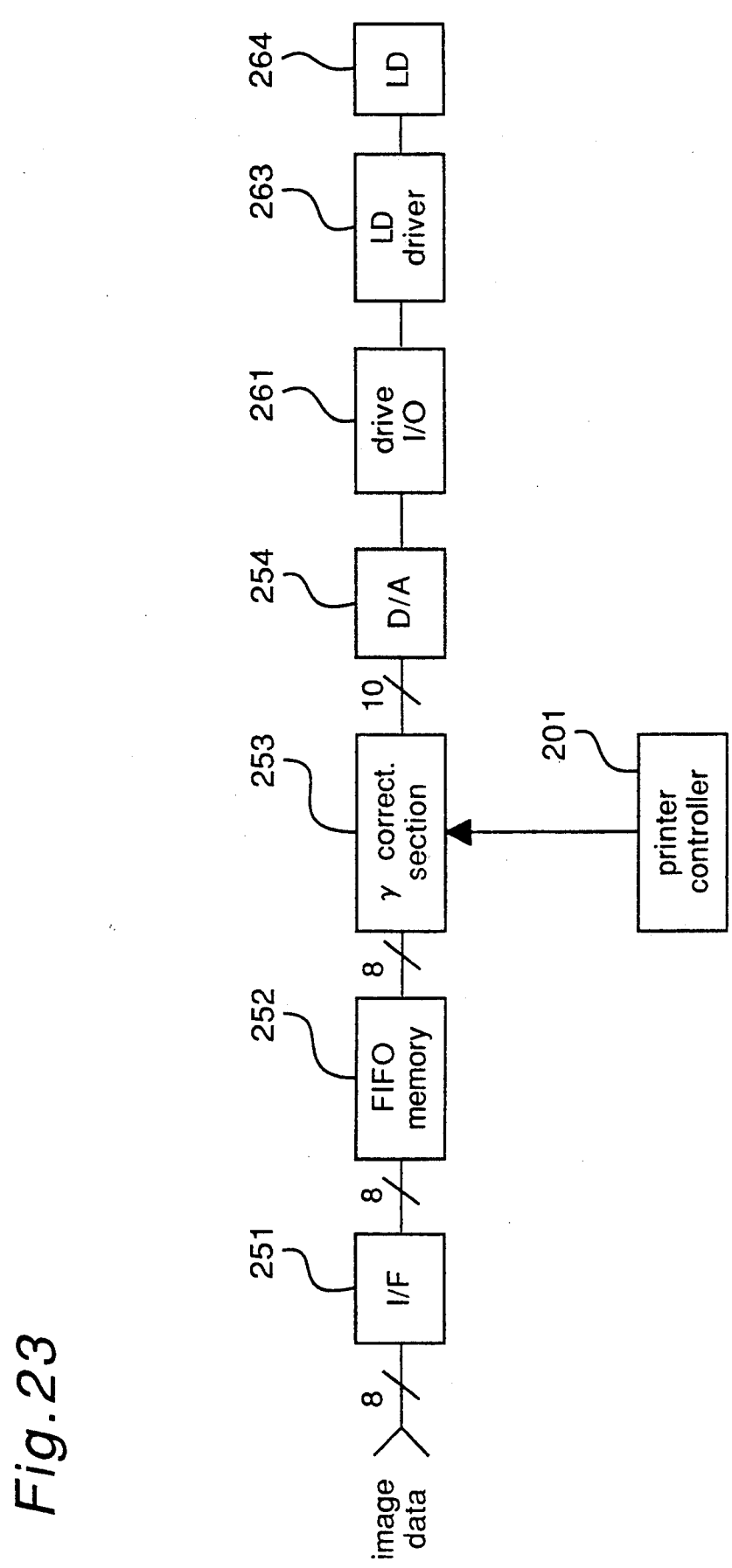
FIG. 23 is a block diagram of the image data processing in the printer controller.

FIG. 23 shows image data processing in the printer controller 201. Multi-level (8-bit) image data received from the image signal processor 20 are received through an interface 251 and are stored in a first-in first-out (FIFO) memory 252. The FIFO memory 252 is a line buffer memory which can store gradation data of a prescribed line number in the main scan direction and it buffers the difference of the clock frequencies between the image reader 10 and the printer 200. The data in the FIFO memory 252 are inputted to a gamma correction section 253. Gamma correction data in the data ROM 203 are sent to the gamma correction section 253 by the printer controller 201, and the gamma correction section 253 corrects the input data (ID) to send an output level to a D/A converter 254. The D/A converter 254 converts the digital input data to an analog voltage, which is sent through a drive I/O 261 to a laser diode (LD) driver 263 which drives the laser diode 264 to emit a light of an intensity in correspondence to the digital image data.

(F) Laser optical system

Figure 24:
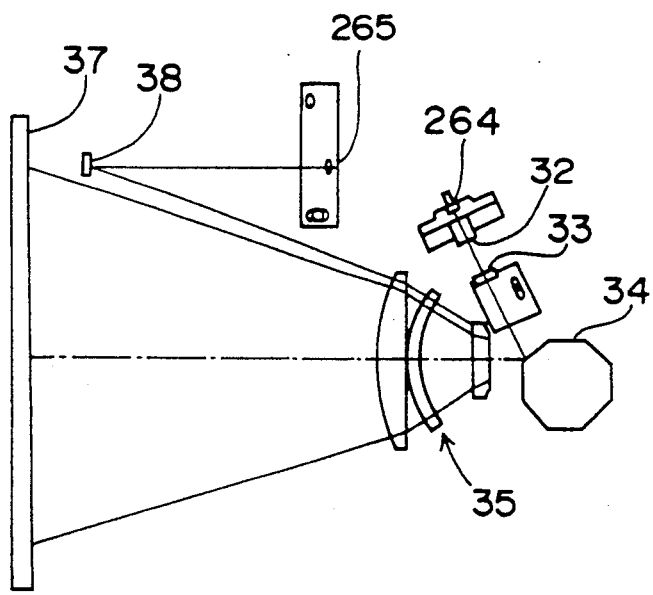
FIG. 24 is a schematic diagram of an optical system.

As shown in FIG. 24, a laser beam emitted from the laser diode 264 propagates through a collimating lens 32 and a cylindrical lens 33 and is reflected by a rotating polygon mirror 34. Then, the laser beam reaches through an f-θ lens 35 and a mirror 37 to scan the photoconductor drum 41 (not shown) in the main scan direction. A beam size sensor 265 is located at a position to detect the laser beam reflected from an SOS mirror 38. The length of the optical path to the sensor 265 via the SOS mirror 38 is set to be equal to that to the photoconductor drum 41 via the mirror 37, and the laser beam is focused on the sensor 265 similarly to on the photoconductor drum 41. A CCD linear sensor is used as the beam size sensor 265. The CCD sensor chips are aligned in a line, and the width of one chip (chip pitch d) is for example set to be 20 μm.

Figure 25:
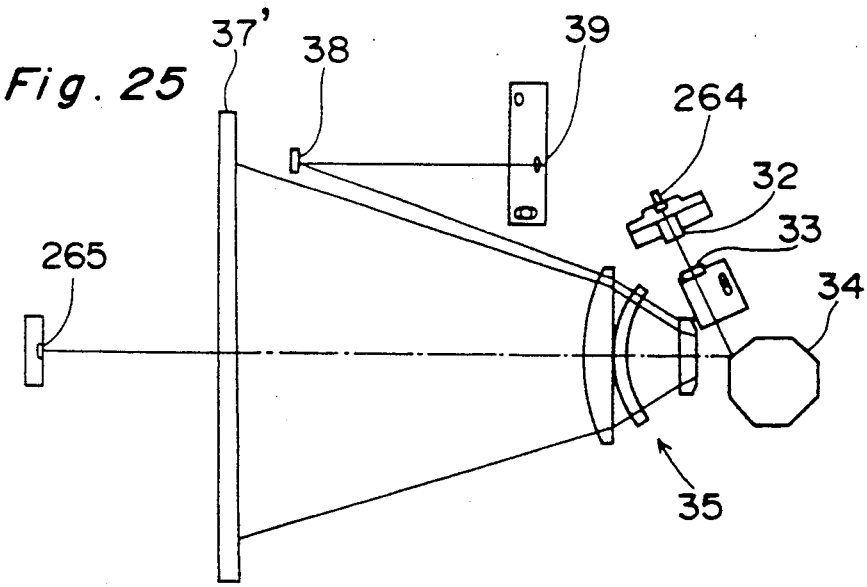
FIG. 25 is another schematic diagram of an optical system.

FIG. 25 shows another example of a laser optical system which is different from that shown in FIG. 24 in a point that the laser beam reaches via a half mirror 37' both to the photoconductor drum 41 and to the beam size sensor 265. Because the beam size is not constant in the main scan direction, the beam size sensor 265 is affected by the distortion if it is located especially at a peripheral area. In order to prevent the effect of the distortion, the beam size sensor 265 is located to detect the beam size at the center of the scan. Thus, the beam size is measured at a high precision. A sensor 39 detects the start of a scan.

Figure 26:
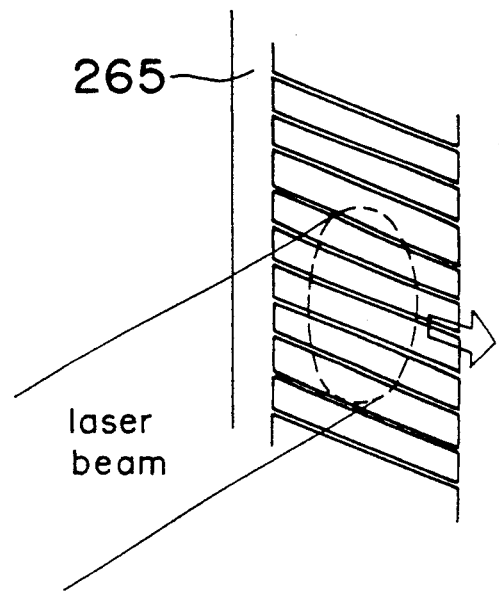
FIG. 26 is a diagram for explaining the beam size measurement.
Figure 27:
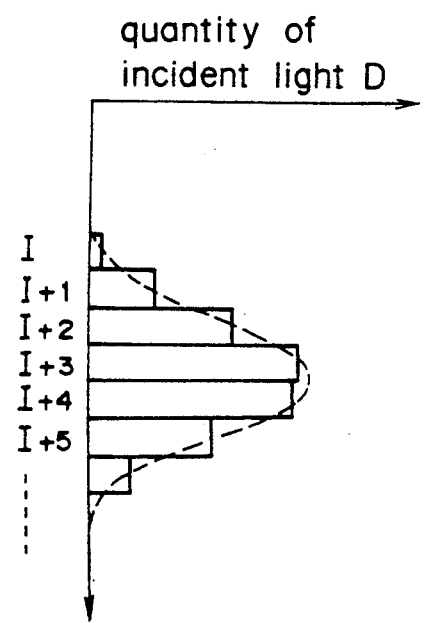
FIG. 27 is a graph of the data of the CCD sensor.

The resolution of the beam size sensor 265 is for example 20 μm while a laser beam has a size of 50–60 μm. However, because the laser beam has the Gaussian distribution, the beam size can be detected correctly. The beam size is measured as explained below. If the laser beam is incident on the beam size sensor 265 as shown in FIG. 26, the received quantity of light of each chip is measured as shown in FIG. 27. The pitch d of the chips denoted as I, I+1, I+2, . . . of the beam size sensor 265 is 20 μm. The beam size can be determined by assuming that the distribution of the measured quantity of light has a Gaussian distribution. That is, the center position of the beam size is calculated by using the following formula:

$$\mu = \sum_{I=0}^{N} I \cdot D_I / \sum_{I=0}^{N} D_I. \tag{11}$$

Then, the standard deviation $\sigma^2$ of the beam size distribution is calculated.

$$\sigma^2 = \sum_{I=0}^{N} (I - \mu)^2 \cdot D_I / \sum_{I=0}^{N} D_I. \tag{12}$$

Thus, the distribution of the quality of light of the laser beam can be expressed as follows:

$$P_s(y) = \frac{\sum_{I=0}^{N} D_I}{\sqrt{2\pi}\sigma} \exp(-(y-\mu)^2/2\sigma^2). \quad (13)$$

The half-width $W_{\frac{1}{2}}$ of laser beam has a relation with the standard deviation $\sigma$ as follows:

$$W_{\frac{1}{2}} = 2d\sigma(\ln 2). \quad (14)$$

Therefore, the beam size can be determined by using Eq. 14.

(G) Flow of printer control

Figure 28:
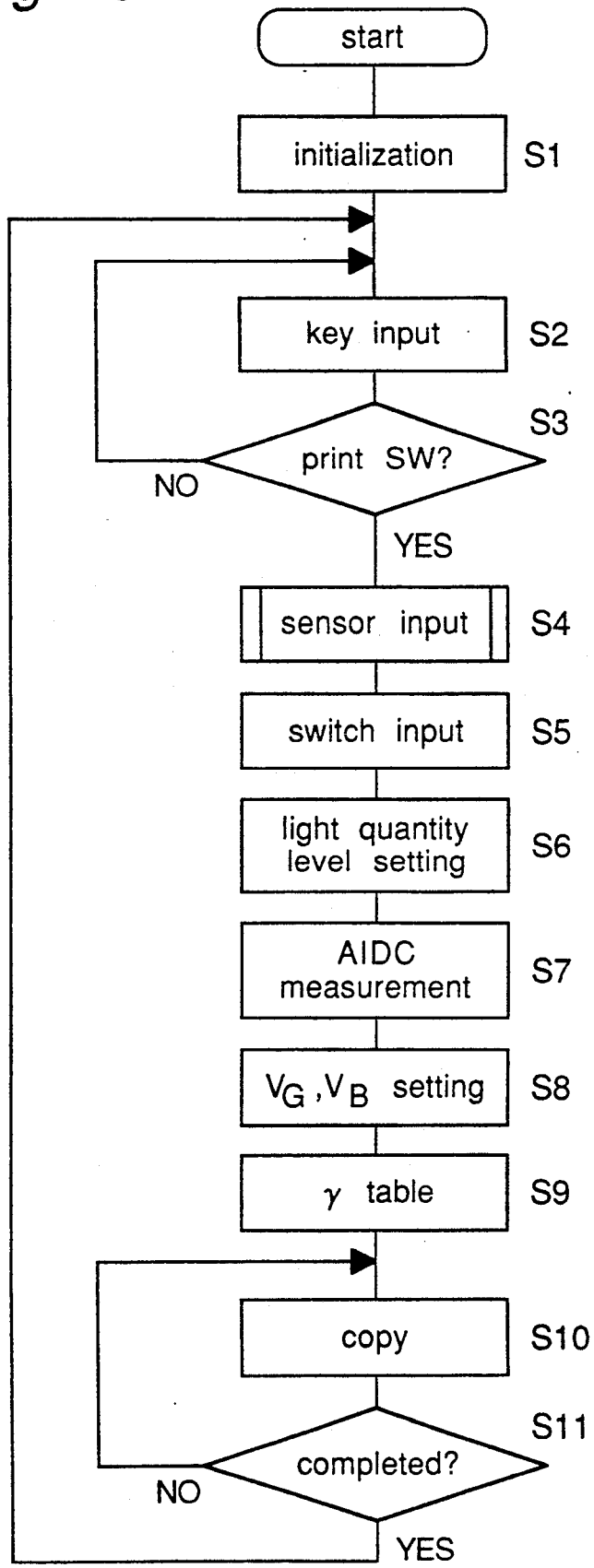
FIG. 28 is a flowchart of the control of the printer controller.

FIG. 28 shows a control flow of the printer controller 201. First at step S1, the initialization of the printer controller 201 is performed, and at step S2, the input processing of the operational panel 221 is performed. Next, at step S3, it is decided if a start key in the operational panel 221 is pressed or not.

Figure 29:
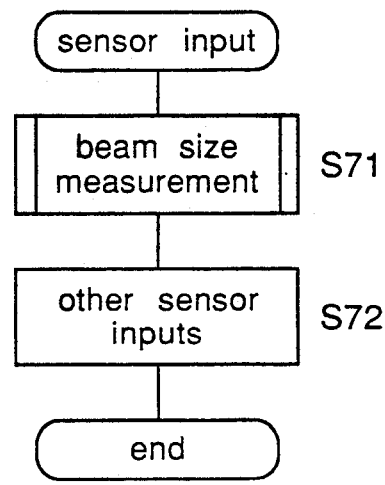
FIG. 29 is a flowchart of the sensor input processing.

If it is decided at step S3 that the start key is pressed, the sensor inputs are received at step S4 (refer FIG. 29). Next, at step S5, the switch inputs are processed. Then, at step S6, the level of the maximum light-emitting of the laser diode 264 is determined. Next, at step S7, the AIDC processing is performed. That is, after the grid voltage $V_G$ and the development bias voltage $V_B$ are set to be prescribed standard values, a toner image of a standard image pattern is formed on the photoconductor drum 41 and the amount of adhered toners of the image is measured with the AIDC sensor 210 and it is stored in the RAM in the printer controller 201. Next, at step S8, the density detection level LBA is selected according to the amount of adhered toners measured at step S6, and the grid voltage $V_G$, the development bias voltage $V_B$ and the code or the shift value for obtaining the gradation correction table are also selected according to the density detection level LBA. Next, at step S9, the gamma correction table is obtained for example from the code.

At step S10, a known copy action is carried out by using the selected grid voltage $V_G$, the selected bias voltage $V_B$ and the gamma correction table. Then, it is decided if the copy action completes or not at step S11. If the copy action is decided to complete, the flow returns to step S2, otherwise the flow returns to step S10.

Figure 30:
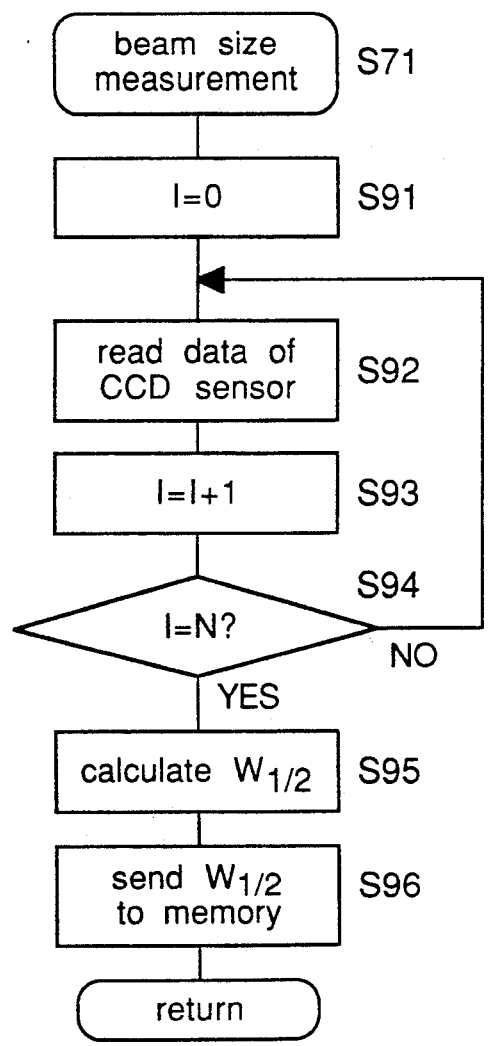
FIG. 30 is a flowchart of the beam size measurement.

In the sensor input processing shown in FIG. 29, the beam size is measured with the beam size sensor 265 at step S71 (refer FIG. 30). Then, the outputs of other sensors are received at step S72.

FIG. 30 shows a flow of the beam size measurement (S71 in FIG. 29). First, a variable I is initialized at zero at step S91. Then, a data D(I) of the CCD sensor is read at step S92, and the variable is incremented by one at step S93. The reading processing is repeated until I reaches to a predetermined number N (YES at step S94). Then, the calculations of the above-mention Eqs. 11–14 are performed to determined the half-width $W_{\frac{1}{2}}$ at step S95, and the obtained value is stored in the memory at step S96.

By using the half-width $W_{\frac{1}{2}}$, various values are determined as shown in Tables 2, 5 and 7. In Table 2, the gamma correction table selection code N is determined according to the half-width $W_{\frac{1}{2}}$. In Table 5, the shift value BG is determined according to the half-width $W_{\frac{1}{2}}$.

In Table 7, the table correction code T2 is determined according to the half-width $W_{\frac{1}{2}}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for forming a digital image, comprising:
    a photoconductor;
    an exposure means for emitting a beam to said photoconductor to form a latent image;
    a development means for developing the latent image;
    a drive means for driving said exposure means so as to modulate the intensity of the beam according to multi-level image data;
    a beam size detection means for detecting the size of the beam;
    a toner density detection means for making said exposure means and said development means to form a standard toner image in the prescribed conditions and for detecting the toner density of the standard toner image;
    a memory means for storing a plurality of types of gradation correction data;
    a selection means for selecting one of the plurality of gradation correction data stored in the memory means according to the beam size detected by said beam size detection means and the toner density detected by said toner density detection means; and
    a correction means for correcting the multi-level image data by using the gradation correction data selected by said selection means.

2. The apparatus according to claim 1, wherein said toner density detection means forms the standard toner image by supplying an image data to said drive means to emit the beam at an intermediate light intensity.

3. The apparatus according to claim 2, wherein said intermediate light intensity of the beam is a light intensity at which the reproduced image density is not affected by the beam size.

4. The apparatus according to claim 1, wherein said beam size detection means is arranged over an area of said photoconductor in the main scan direction of the beam, which area being not used to form an image according to multi-level image data.

5. The apparatus according to claim 1, wherein said beam size detection means is arranged over a central area of said photoconductor.

6. The apparatus according to claim 1, wherein said gradation correction data are a table for converting the multi-level image data to light intensity level of the beam.

7. An apparatus for forming a digital image, comprising:
    a photoconductor;
    an exposure means for emitting a beam to said photoconductor to form a latent image;
    a development means for developing the latent image;

a drive means for driving said exposure means so as to modulate the intensity of the beam according to multi-level image data;

a beam size detection means for detecting the size of the beam;

a toner density detection means for making said exposure means and said development means to form a standard toner image in the prescribed conditions and for detecting the toner density of the standard toner image;

a memory means for storing gradation correction data which consists of a plurality of groups, each of which groups consisting of a plurality of gradation correction tables;

a first selection means for selecting one of the plurality of groups stored in said memory means according to the beam size detected by said beam size detection means;

a second selection means for selecting one of gradation correction tables in the group selected by said first selection means according to the toner density detected by said toner density detection means; and a correction means for correcting the multi-level image data to be supplied to said drive means by using the gradation correction table selected by said second selection means.

8. The apparatus according to claim 7, wherein said toner density detection means forms the standard toner image by supplying an image data to said drive means so as to emit the beam at an intermediate light intensity.

9. The apparatus according to claim 8, wherein said intermediate light intensity of the beam is a light intensity at which the reproduced image density is not affected by the beam size.

10. An apparatus for forming a digital image, comprising:

a photoconductor;

an exposure means for emitting a beam to said photoconductor to form a latent image;

a development means for developing the latent image;

a drive means for driving said exposure means so as to modulate the intensity of the beam according to multi-level image data;

a beam size detection means for detecting the size of the beam;

a toner density detection means for making said exposure means and said development means to form a standard toner image in the prescribed conditions and for detecting the toner density of the standard toner image;

a memory means for storing a plurality of gradation correction data;

a selection means for selecting one of the plurality of gradation correction data stored in said memory means according to the toner density detected by said toner density detection means; and a gradation data correction means for correcting the gradation correction data selected by said selection means according to the beam size detected by said beam size detection means; and an image data correction means for correcting the multi-level image data to be supplied to said drive means by using the gradation correction data corrected by said gradation data correction means.

11. The apparatus according to claim 10, wherein said toner density detection means forms the standard toner image by supplying an image data to said drive means so as to emit the beam at an intermediate light intensity.

12. The apparatus according to claim 11, wherein said intermediate light intensity of the beam is a light intensity at which the reproduced image density is not affected by the beam size.

13. An apparatus for forming a digital image, comprising:

a photoconductor;

an exposure means for emitting a beam to said photoconductor to form a latent image;

a development means for developing the latent image;

a drive means for driving said exposure means so as to modulate the intensity of the beam according to multi-level image data;

a beam size detection means for detecting the size of the beam;

a toner density detection means for making said exposure means and said development means to form a standard toner image in the prescribed conditions and for detecting the toner density of the standard toner image;

a memory means for storing a gradation correction data;

a gradation data correction means for correcting the gradation correction data stored in said memory means according to the toner density detected by said toner density detection means and the beam size detected by said beam size detection means; and an image data correction means for correcting the multi-level image data to be supplied to said drive means by using the gradation correction data corrected by said gradation data correction means.

14. The apparatus according to claim 13, wherein said toner density detection means forms the standard toner image by supplying an image data to said drive means so as to emit the beam at an intermediate light intensity.

15. The apparatus according to claim 14, wherein said intermediate light intensity of the beam is a light intensity at which the reproduced image density is not affected by the beam size.

16. An apparatus for forming a digital image, comprising:

a photoconductor;

an exposure means for emitting a beam to said photoconductor to form a latent image;

a development means for developing the latent image;

a drive means for driving said exposure means so as to modulate the intensity of the beam according to multi-level image data;

a beam size detection means for detecting the size of the beam;

a toner density detection means for making said exposure means and said development means to form a standard toner image in the prescribed conditions and for detecting the toner density of the standard toner image;

a memory means for storing a plurality of gradation correction data;

a selection means for selecting one of the plurality of gradation correction data stored in said memory means according to the toner density detected by said toner density detection means and to the beam size detected by said beam size detection means; and gradation correction data stored in said memory means according to the toner density detected by said toner density detection means and the beam size detected by said beam size detection means; and an image data correction means for correcting the multi-level image data to be supplied to said drive means by using the gradation correction data selected by said selection means.

17. The apparatus according to claim 16, wherein said toner density detection means forms the standard toner image by supplying an image data to said drive means so as to emit the beam at an intermediate light intensity.

18. The apparatus according to claim 17, wherein said intermediate light intensity of the beam is a light intensity at which the reproduced image density is not affected by the beam size.

19. A method for forming a digital image, comprising the steps of:

exposing a photoconductor with a beam to form an electrostatic latent image of a standard pattern;

developing the electrostatic latent image with toners;

detecting the toner density of the standard pattern developed;

detecting the size of the beam for exposing the photoconductor;

determining one of the plurality of gradation correction data stored in a memory means according to the detected beam size and the detected toner density;

correcting multi-level image data by using the determined gradation correction data; and forming a half-tone image on the photoconductor by modulating the light intensity of the beam according to the corrected multi-level image data.

* * * * *